US009117387B2

(12) United States Patent
Hwangbo

(10) Patent No.: US 9,117,387 B2
(45) Date of Patent: Aug. 25, 2015

(54) IMAGE DISPLAY APPARATUS AND METHOD FOR OPERATING THE SAME

(75) Inventor: Sang Kyu Hwangbo, Seoul (KR)

(73) Assignee: LG Electronics Inc., Seoul (KR)

( * ) Notice: Subject to any disclaimer, the term of this patent is extended or adjusted under 35 U.S.C. 154(b) by 518 days.

(21) Appl. No.: 13/449,547

(22) Filed: Apr. 18, 2012

(65) Prior Publication Data

US 2012/0268460 A1    Oct. 25, 2012

(30) Foreign Application Priority Data

Apr. 19, 2011    (KR) .................. 10-2011-0036321

(51) Int. Cl.
G09G 5/00    (2006.01)
H04N 13/00    (2006.01)
H04N 13/04    (2006.01)
G09G 3/00    (2006.01)

(52) U.S. Cl.
CPC .......... G09G 5/003 (2013.01); H04N 13/0048 (2013.01); H04N 13/0452 (2013.01); G09G 3/003 (2013.01); G09G 2340/04 (2013.01); G09G 2370/047 (2013.01); G09G 2370/12 (2013.01)

(58) Field of Classification Search
CPC ............ A63F 13/12; A63F 2300/5533; A63F 2300/8088; G09G 3/003; G09G 5/003; G09G 2340/04
USPC .................................................. 345/660–671
See application file for complete search history.

(56) References Cited

U.S. PATENT DOCUMENTS

| 7,224,404 | B2* | 5/2007 | An et al. ...................... 348/584 |
| 7,555,715 | B2* | 6/2009 | Randall et al. ................ 715/249 |
| 7,559,834 | B1* | 7/2009 | York ................................. 463/2 |
| 8,384,774 | B2* | 2/2013 | Gallagher ....................... 348/60 |
| 2006/0013560 | A1 | 1/2006 | Jung et al. |
| 2007/0258010 | A1 | 11/2007 | Hong et al. |
| 2009/0034806 | A1 | 2/2009 | Hayase |
| 2009/0122373 | A1 | 5/2009 | Okamoto |
| 2009/0207296 | A1 | 8/2009 | Suehiro et al. |
| 2009/0315869 | A1* | 12/2009 | Sugihara et al. ............... 345/204 |
| 2010/0215347 | A1* | 8/2010 | Ikeda et al. ................... 386/108 |

FOREIGN PATENT DOCUMENTS

| CN | 1722816 A | 1/2006 |
| CN | 1890960 A | 1/2007 |
| CN | 101399917 A | 4/2009 |
| CN | 101404151 A | 4/2009 |
| JP | 2009-38680 A | 2/2009 |
| JP | 2009-88708 A | 4/2009 |

* cited by examiner

Primary Examiner — Charles Tseng
(74) Attorney, Agent, or Firm — Birch, Stewart, Kolasch & Birch, LLP

(57) ABSTRACT

An image display apparatus and a method for operating the same are disclosed. The method of operating an image display apparatus includes receiving an input external image, receiving supplementary information indicating the number of external images to be displayed or the number of sub images in the external image to be displayed, rearranging the external image or sub images based on the supplementary information, and displaying the rearranged external images or sub images. Accordingly, it is possible to conveniently detect the number of external images to be displayed or the number of sub images to be displayed.

10 Claims, 20 Drawing Sheets

FIG. 5
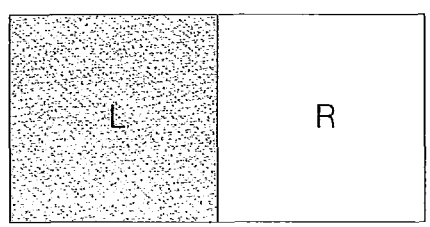
(a)
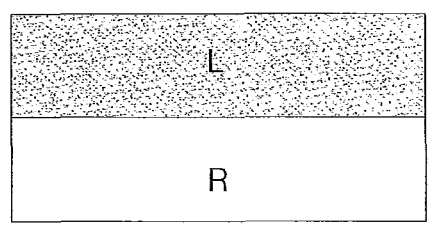
(b)
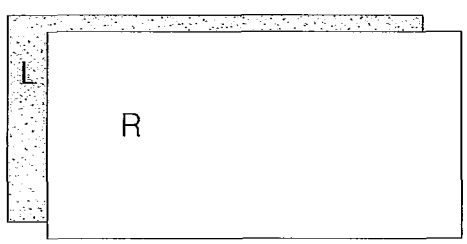
(c)
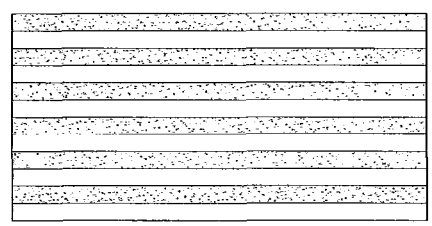
(d)
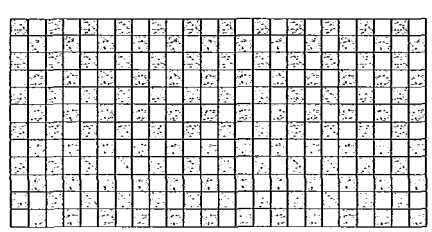
(e)

FIG. 11

| Byte\Bit # | 7 | 6 | 5 | 4 | 3 | 2 | 1 | 0 |
|---|---|---|---|---|---|---|---|---|
| HB0 | Pack Type = 0x81 ||||||||
| HB1 | Version = 0x01 ||||||||
| HB2 | 0 | 0 | 0 | Length = Nv |||||

FIG. 12

| Packet Byte # | 7 | 6 | 5 | 4 | 3 | 2 | 1 | 0 |
|---|---|---|---|---|---|---|---|---|
| PB0 | Checksum ||||||||
| PB1 | 24bit IEEE Registration Identifier (0x000C03)<br>(least significant byte first) ||||||||
| PB2 | ||||||||
| PB3 | ||||||||
| PB4 | HDMI_Video_Format ||| Rsvd (0) | Rsvd (0) | Rsvd (0) | Rsvd (0) | Rsvd (0) |
| PB5 | HDMI_VIC ||||||||
|  | 3D-Structure |||| Reserved(0) ||||
| PB(Nv) | Reserved(0) ||||||||

FIG. 13

| Value [2...0] | description |
|---|---|
| 000 | No addiitional HDMI video format is presented in this packet. |
| 001 | Extended resolution format (e.g.used for 4K x 2K video) preaent 1 byte of HDMI_VIC parameter value folloes. |
| 010 | 3D formatindication present.<br>3D_Structure follows. |
| 011 ~ 111 | Reserved for future use |

FIG. 14

| Packet Byte # | 7 | 6 | 5 | 4 | 3 | 2 | 1 | 0 |
|---|---|---|---|---|---|---|---|---|
| PB0 | Checksum | | | | | | | |
| PB1 | 24bit IEEE Registration Identifier (0x000C03) (least significant byte first) | | | | | | | |
| PB2 | | | | | | | | |
| PB3 | | | | | | | | |
| PB4 | HDMI_Video_Format | | | Rsvd (0) | Rsvd (0) | Rsvd (0) | Rsvd (0) | Rsvd (0) |
| (PB5) | HDMI_VIC | | | | | | | |
| (PB5) | 3D-Structure | | | | 3D-Meta_present | N-View_present | Rsvd (0) | Rsvd (0) |
| (PB6) | 3D-Ext_Data | | | | N-View_NumOfView (=N) | | | |
| (PB7) | 3D-Metadata_type | | | | 3D-Metadata_Length (=N) | | | |
| (PB8) | 3D-Metadata_1 | | | | | | | |
| ... | ... | | | | | | | |
| (PB[7=N]) | 3D-Metadata_N | | | | | | | |
| PB[8+N]~[Nv] | Reserved(0) | | | | | | | |

IMAGE DISPLAY APPARATUS AND METHOD FOR OPERATING THE SAME

CROSS-REFERENCE TO RELATED APPLICATION

This application claims the priority benefit of Korean Patent Application No. 10-2011-0036321, filed on Apr. 19, 2011 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly to an image display apparatus, which is able to easily check the number of external images to be displayed and the number of sub images to be displayed, and a method for operating the same.

2. Description of the Related Art

An image display apparatus functions to display images to a user. A user can view a broadcast program using an image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting, such as robustness against noise, less data loss, ease of error correction, and the ability to provide clear, high-definition images. Digital broadcasting also allows interactive viewer services, compared to analog broadcasting.

An image display apparatus may receive external input images from various external input apparatuses and display the external input images.

SUMMARY OF THE INVENTION

Therefore, the present invention has been made in view of the above problems, and it is an object of the present invention to provide an image display apparatus, which is able to easily check the number of external images to be displayed and the number of sub images to be displayed, and a method for operating the same.

It is another object of the present invention to provide an image display apparatus, which is able to conveniently display external images according to the number of external images or sub images, and a method for operating the same.

In accordance with an aspect of the present invention, the above and other objects can be accomplished by the provision of a method of operating an image display apparatus, including receiving an input external image, receiving supplementary information indicating the number of external images to be displayed or the number of sub images in the external image to be displayed, rearranging the external images or sub images based on the supplementary information, and displaying the rearranged external images or sub images.

In accordance with another aspect of the present invention, there is provided a method of operating an image display apparatus, including receiving an input external image, detecting a pattern block in the external image indicating the number of external images to be displayed or the number of sub images in the external image to be displayed, rearranging the external images or sub images based on the detected pattern block, and displaying the rearranged external images or sub images.

In accordance with another aspect of the present invention, there is provided an image display apparatus including an image input unit configured to receive an input external image and receive supplementary information indicating the number of external images to be displayed or the number of sub images in the external image to be displayed, an image rearrangement unit configured to rearrange the external images or sub images based on the supplementary information, and a display configured to display the rearranged external images or sub images.

In accordance with another aspect of the present invention, there is provided an image display apparatus including an image input unit configured to receive an input external image, a pattern detector configured to detect a pattern block in the external image indicating the number of external images to be displayed or the number of sub images in the external image to be displayed, an image rearrangement unit configured to rearrange the external images or sub images based on the detected pattern block, and a display configured to display the rearranged external images or sub images.

According to one embodiment of the present invention, by receiving and processing the supplementary information indicating the number of external images to be displayed or the number of sub images in the external image to be displayed, it is possible to conveniently detect the number of external images to be displayed or the number of sub images in the external image to be displayed.

According to another embodiment of the present invention, by detecting the pattern block indicating the number of external images to be displayed or the number of sub images in the external image to be displayed, it is possible to conveniently detect the number of external images to be displayed or the number of sub images in the external image to be displayed.

By rearranging the external images or sub images in correspondence with the detected number of external images or sub images and distributing and displaying the external images or the sub images to and on the display, it is possible to visibility of the image display apparatus.

By displaying an object indicating a glasses wear message or a glasses removal message if the number of external images to be displayed or the number of sub images to be displayed is increased or decreased, it is possible to increase user convenience.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a diagram showing various formats of a 3D image;

FIGS. 10 to 22 are views referred to for describing various examples of the method for operating the image display apparatus, illustrated in FIG. 9;

DETAILED DESCRIPTION OF THE PREFERRED EMBODIMENTS

Exemplary embodiments of the present invention will be described with reference to the attached drawings.

The terms "module" and "unit" attached to describe the names of components are used herein to help the understanding of the components and thus they should not be considered as having specific meanings or roles. Accordingly, the terms "module" and "unit" may be used interchangeably.

Figure 1:
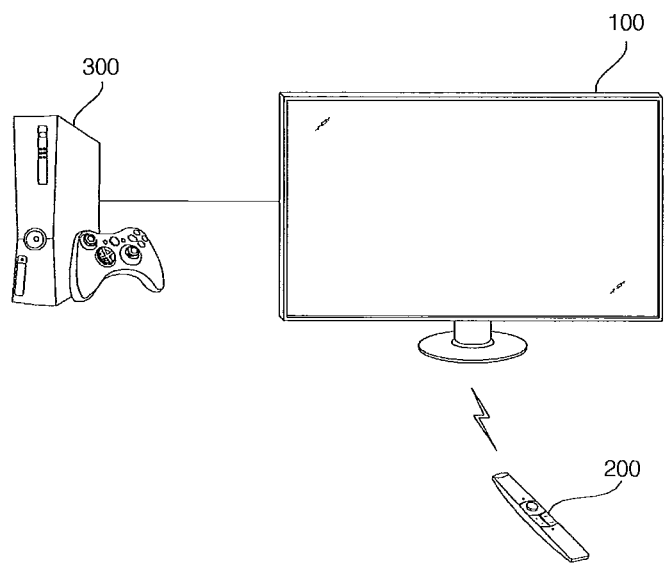
FIG. 1 is a block diagram showing a configuration of an image display apparatus according to an embodiment of the present invention.

FIG. 1 is a diagram showing the configuration of an image display apparatus according to an embodiment of the present invention.

Referring to FIG. 1, the image display apparatus 100 according to the embodiment of the present invention is connected to a broadcast station, a network server or an external apparatus wirelessly or by wire, thereby transmitting or receiving data to or from the broadcast station, the network server or the external apparatus.

The image display apparatus 100 may receive a broadcast signal including a video signal and an audio signal from the broadcast station, process the video or audio signal, and output the video or audio signal.

The image display apparatus 100 may receive content through the network server, for example, the Internet and output a video or audio signal corresponding to the content.

The external apparatus may be a media storage or a player used by a user. For example, the external apparatus may be a camera, a digital versatile disc (DVD) player, a Blu-ray player, a personal computer, or a game console.

In FIG. 1, the image display apparatus is connected to a game console 300 among various external apparatuses so as to transmit or receive data to or from the game console. The game console 300 may output a video or audio signal to the image display apparatus 100 autonomously or through a medium (an optical disc, a memory, or the like) inserted thereinto.

Figure 2:
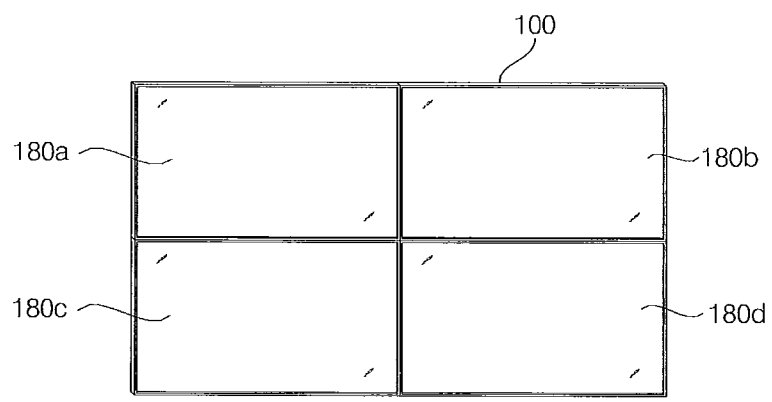
FIG. 2 is a diagram showing the image display apparatus of FIG. 1 including a plurality of display panels.

FIG. 2 is a diagram showing the image display apparatus of FIG. 1 including a plurality of display panels.

Referring to FIG. 2, the image display apparatus 100 of FIG. 1 may include a plurality of displays 180a, 180b, 180c and 180d. In FIG. 2, the four displays are arranged in a 2×2 matrix.

If the image display apparatus 100 includes a plurality of displays, a single frame may be displayed using all the plurality of displays. Alternatively, the same single frame may be displayed on each display.

Unlike FIG. 2, the number of displays included in the image display apparatus may be variously changed. For example, the number of displays may be 2 (1×2 or 2×1), 3 (1×3 or 3×1), 6 (2×3 or 3×2) or 9 (3×3).

Figure 3:
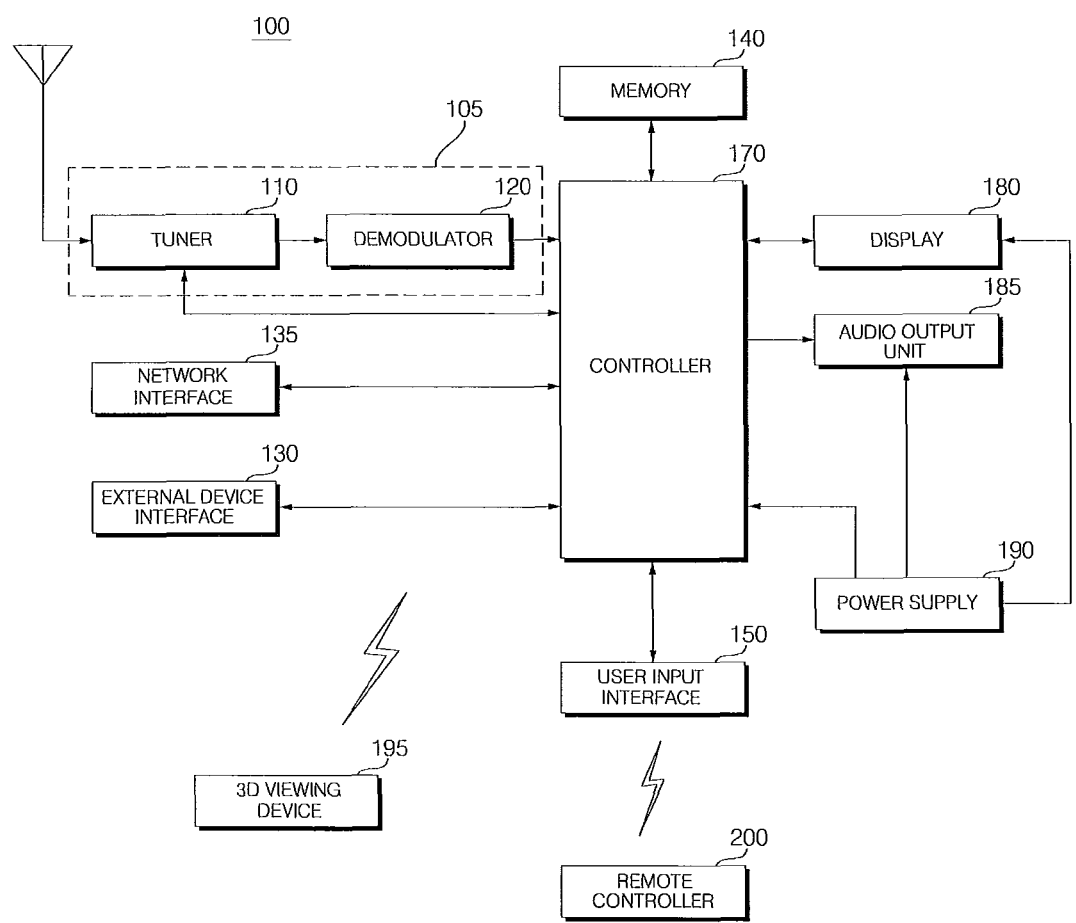
FIG. 3 is a block diagram showing an internal configuration of the image display apparatus of FIG. 1.

FIG. 3 is a block diagram showing the internal configuration of the image display apparatus according to the embodiment of the present invention.

Referring to FIG. 3, an image display apparatus 100 according to the embodiment of the present invention includes a broadcast reception unit 105, an external device interface 130, a network interface 135, a memory 140, a user input interface 150, a controller 170, a display 180, an audio output unit 185, a power supply 190 and a 3D viewing device 195.

The broadcast reception unit 105 may include a tuner 110, a demodulator 120 and a network interface 135. As needed, the broadcast reception unit 105 may include only the tuner 110 and the demodulator 120 or only the network interface 135.

The tuner 110 tunes to a Radio Frequency (RF) broadcast signal corresponding to a channel selected by a user from among RF broadcast signals received through an antenna or RF broadcast signals corresponding to all channels previously stored in the image display apparatus. The tuned RF broadcast is converted into an Intermediate Frequency (IF) signal or a baseband Audio/Video (AV) signal.

For example, the tuned RF broadcast signal is converted into a digital IF signal DIF if it is a digital broadcast signal and is converted into an analog baseband AV signal (Composite Video Banking Sync/Sound Intermediate Frequency (CVBS/SIF)) if it is an analog broadcast signal. That is, the tuner 110 may process a digital broadcast signal or an analog broadcast signal. The analog baseband AV signal (CUBS/SIF) output from the tuner unit 110 may be directly input to the controller 170.

The tuner 110 may sequentially select a number of RF broadcast signals corresponding to all broadcast channels previously stored in the image display apparatus by a channel storage function from a plurality of RF signals received through the antenna and may convert the selected RF broadcast signals into IF signals or baseband A/V signals.

The demodulator 120 receives the digital IF signal DIF from the tuner 110 and demodulates the digital IF signal DIF. The demodulator 120 may perform demodulation and channel decoding, thereby obtaining a stream signal. The stream signal may be a signal in which a video signal, an audio signal and a data signal are multiplexed.

The stream signal output from the demodulator 120 may be input to the controller 170 and thus subjected to demultiplexing and A/V signal processing. The processed video and audio signals are output to the display 180 and the audio output unit 185, respectively.

The external device interface 130 may serve as an interface between an external device and the image display apparatus 100. For interfacing, the external device interface 130 may include an A/V Input/Output (I/O) unit (not shown) and/or a wireless communication module (not shown).

The external device interface 130 may be connected to an external device such as a Digital Versatile Disc (DVD) player, a Blu-ray player, a game console, a camera, a camcorder, or a computer (e.g., a laptop computer), wirelessly or by wire. Then, the external device interface 130 externally receives video, audio, and/or data signals from the external device and transmits the received input signals to the controller 170. In addition, the external device interface 130 may output video, audio, and data signals processed by the controller 170 to the external device. In order to receive or transmit audio, video and data signals from or to the external device, the external device interface 130 includes the A/V I/O unit (not shown) and/or the wireless communication module (not shown).

The external device interface 130 may be connected to various set-top boxes through at least one of the above-described ports and may thus receive data from or transmit data to the various set-top boxes.

The external device interface 130 may transmit or receive data to or from the 3D viewing device 195.

The network interface 135 serves as an interface between the image display apparatus 100 and a wired/wireless network such as the Internet.

The network interface 135 may receive content or data provided by an Internet or content provider or a network operator over a network.

The network interface 135 may be connected to, for example, an Internet Protocol (IP) TV. The network interface 135 may receive and transmit video, audio or data signal processed by an IPTV set-top box to the controller 170, and transmit the signals processed by the controller 170 to the IPTV set-top box, for interactive communication.

The IPTV may include ADSL-TV, VDSL-TV, FTTH-TV, etc. according to the type of a transmission network and may include TV over DSL, Video over DSL, TV over IP (TVIP), Broadband TV (BTV), etc. The IPTV may include Internet TV and full-browsing TV.

The memory 140 may store various programs necessary for the controller 170 to process and control signals, and may also store processed video, audio and data signals.

The memory 140 may temporarily store a video, audio and/or data signal received from the external device interface 130. The memory 140 may store information about a predetermined broadcast channel by the channel storage function of a channel map.

While the memory 140 is shown in FIG. 3 as configured separately from the controller 170, to which the present invention is not limited, the memory 140 may be incorporated into the controller 170.

The user input interface 150 transmits a signal input by the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals received from local keys (not shown), such as inputs of a power key, a channel key, and a volume key, and setting values.

For example, the user input interface 150 may transmit a user input signal received from a sensor unit (not shown) for sensing a user gesture to the controller 170 or transmit a signal received from the controller 170 to the sensor unit (not shown). The sensor unit (not shown) may include a touch sensor, a voice sensor, a position sensor, a motion sensor, etc.

The controller 170 may demultiplex the stream signal received from the tuner 110, the demodulator 120, or the external device interface 130 into a number of signals, process the demultiplexed signals into audio and video data, and output the audio and video data.

The video signal processed by the controller 170 may be displayed as an image on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to the external output device through the external device interface 130.

While not shown in FIG. 3, the controller 170 may include a DEMUX, a video processor, etc., which will be described in detail later with reference to FIG. 4.

The controller 170 may control the overall operation of the image display apparatus 100. For example, the controller 170 controls the tuner 110 to tune to an RF signal corresponding to a channel selected by the user or a previously stored channel.

The controller 170 may control the image display apparatus 100 by a user command input through the user input interface 150 or an internal program.

For example, the controller 170 may control the tuner unit 110 to receive the signal of the selected channel according to a predetermined channel selection command received through the user input interface 150 and process the video, audio or data signal of the selected channel. The controller 170 outputs the channel information selected by the user along with the video or audio signal through the display 180 or the audio output unit 185.

As another example, the controller 170 outputs a video or audio signal received from the external device such as a camera or a camcorder through the external device interface 130 to the display 180 or the audio output unit 185 according to an external device video playback command received through the external device interface 150.

The controller 170 may control the display 180 to display images. For instance, the controller 170 may control the display 180 to display a broadcast image received from the tuner unit 110, an external input image received through the external device interface 130, an image received through the network interface 135, or an image stored in the memory 140.

The image displayed on the display 180 may be a Two-Dimensional (2D) or Three-Dimensional (3D) still or moving image.

The controller 170 may generate and display a 3D object with respect to a predetermined object among images displayed on the display 180. For example, the object may be at least one of an accessed web screen (newspaper, magazine, etc.), an EPG, various menus, a widget, an icon, a still image, a moving image, or a text file.

The 3D object may be processed to have a depth different from an image displayed on the display 180. Preferably, the 3D object may be processed to appear to protrude from an image displayed on the display 180.

The controller 170 recognizes the position of the user based on an image captured by a camera unit (not shown). For example, a distance (z-axis coordinate) between the user and the image display apparatus 100 may be detected. An x-axis coordinate and a y-axis coordinate in the image display apparatus 100 corresponding to the position of the user may be detected.

Although not shown, a channel browsing processor for generating a thumbnail image corresponding to a channel signal or an external input signal may be further included. The channel browsing processor may receive the stream signal output from the demodulator 120 or the stream signal output from the external device interface 130, extract an image from the received stream signal, and generate a thumbnail image. The generated thumbnail image may be input to the controller 170 without conversion or in a state of being encoded. The generated thumbnail image may be encoded into a stream form to be input to the controller 170. The controller 170 may display a thumbnail list including a plurality of thumbnail images using the input thumbnail image. The thumbnail list may be displayed in a brief view method of displaying the thumbnail list in a part of an area in a state of displaying a predetermined image or may be displayed in a full viewing method of displaying the thumbnail list in a full area.

The display 180 converts the video signal, the data signal, the OSD signal and the control signal processed by the controller 170 or the video signal, the data signal and the control signal received by the external device interface 130 and generates a drive signal.

The display 180 may be a Plasma Display Panel (PDP), a Liquid Crystal Display (LCD), an Organic Light-Emitting Diode (OLED) display or a flexible display. In particular, the display 180 may be a 3D display.

For viewing a 3D image, the display 180 may be divided into a supplementary display method and a single display method.

In the single display method, a 3D image is implemented on the display 180 without a separate subsidiary device, for example, glasses. The single display method may include, for example, a lenticular method, a parallax barrier, or the like.

In the supplementary display method, a 3D image is implemented on the display 180 using a subsidiary device. The supplementary display method includes various methods such as a Head-Mounted Display (HMD) method or a glasses method. The glasses method may be divided into a passive method such as a polarized glasses method and an active method such as a shutter glasses method. The HMD method may be divided into a passive method and an active method.

If the display 180 is a touchscreen, the display 180 may function as not only an output device but also as an input device.

The audio output unit 185 receives the audio signal processed by the controller 170, for example, a stereo signal, a 3.1-channel signal or a 5.1-channel signal, and outputs the received audio signal as sound. The audio output unit 185 may be implemented by various types of speakers.

In order to sense a user gesture, as described above, a sensing unit (not shown) including at least one of a touch sensor, a voice sensor, a position sensor and a motion sensor may be further included in the image display apparatus 100. The signal sensed by the sensor unit (not shown) is transmitted to the controller 170 through the user input interface 150.

The controller 170 may sense the user gesture by the image captured by a camera unit (not shown), the signal sensed by the sensor unit (not shown), or a combination thereof.

The power supply 190 supplies power to the image display apparatus 100. Particularly, the power supply 190 may supply power to the controller 170 which may be implemented as a System On Chip (SOC), the display 180 for displaying the video signal, and the audio output unit 185 for outputting the audio signal.

The power supply 190 may include a converter (not shown) for converting AC voltage into DC voltage. The power supply 190 may further include a DC/DC converter for changing the level of the DC voltage and outputting the DC voltage with the changed level.

The remote controller 200 transmits user input to the user input interface 150. For transmission of user input, the remote controller 200 may use various communication techniques such as IR communication, RF communication, Bluetooth, Ultra Wideband (UWB) and ZigBee. In addition, the remote controller 200 may receive a video signal, an audio signal or a data signal from the user input interface 150 and output the received signals visually or audibly.

The above-described image display apparatus 100 may be a fixed or mobile digital broadcast receiver capable of receiving a digital broadcast.

The image display apparatus described in the present specification may include a TV receiver, a mobile phone, a smart phone, a notebook computer, a digital broadcast terminal, a Personal Digital Assistant (PDA), a Portable Multimedia Player (PMP), etc.

The block diagram of the image display apparatus 100 illustrated in FIG. 3 is only exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the present invention and thus specific operations or devices should not be construed as limiting the scope and spirit of the present invention.

Figure 4:
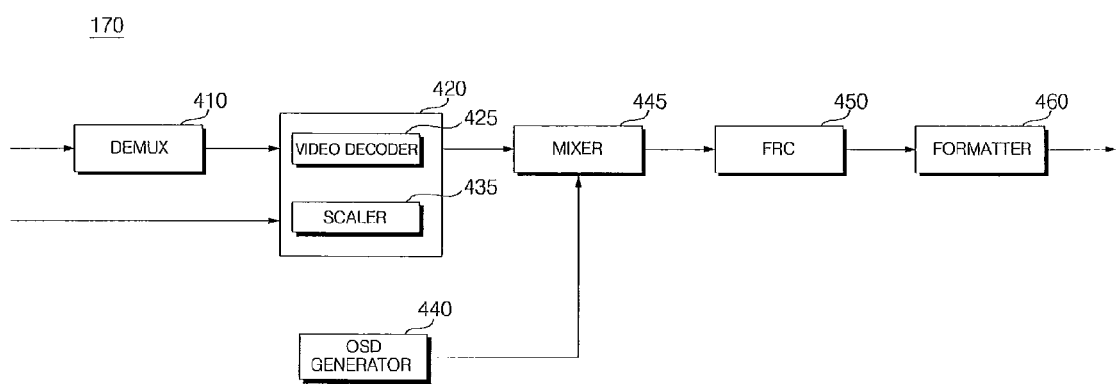
FIG. 4 is a block diagram showing an internal configuration of a controller of FIG. 3.
Figure 6:
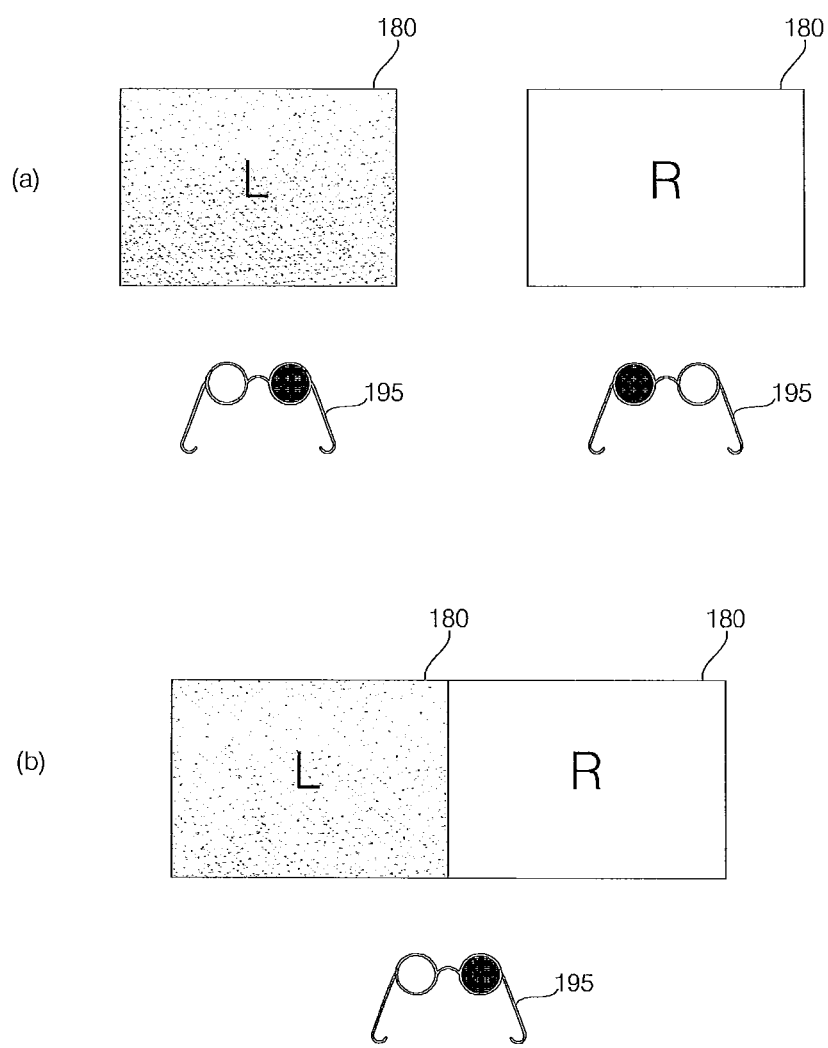
FIG. 6 is a diagram showing an operation of a 3D viewing device according to the formats of FIG. 5.

FIG. 4 is a block diagram showing the internal configuration of the controller illustrated in FIG. 3, FIG. 5 is a diagram showing various formats of a 3D image, and FIG. 6 is a diagram showing an operation of a 3D viewing device according to the formats of FIG. 5.

Referring to FIG. 4, the controller 170 according to the embodiment of the present invention may include a DEMUX 410, a video processor 420, an OSD generator 440, a mixer 445, a Frame Rate Converter (FRC) 450, and a formatter 460. The controller 170 may further include an audio processor (not shown) and a data processor (not shown).

The DEMUX 410 demultiplexes an input stream. For example, the DEMUX 410 may demultiplex an MPEG-2 TS into a video signal, an audio signal, and a data signal. The input stream signal may be received from the tuner 110, the demodulator 120 or the external device interface 135.

The video processor 420 may process the demultiplexed video signal. For video signal processing, the video processor 320 may include a video decoder 425 and a scaler 435.

The video decoder 425 decodes the demultiplexed video signal and the scaler 435 scales the resolution of the decoded video signal so that the video signal can be displayed on the display 180.

The video decoder 425 may be provided with decoders that operate based on various standards.

The video signal decoded by the video processor 420 may include a 2D video signal, a mixture of a 2D video signal and a 3D video signal, or a 3D video signal.

The video processor 420 may determine whether the demultiplexed video signal is a 2D video signal or a 3D video signal. The determination as to whether the demultiplexed video signal is a 3D video signal may be made based on a broadcast signal received from the tuner 110, an external input signal from an external apparatus or an external input signal received over a network. In particular, the determination as to whether the demultiplexed video signal is a 3D video signal may be made by referring to a 3D video flag in a header of a stream, 3D video metadata or 3D video format information indicating a 3D image.

The decoded video signal from the video processor 420 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

Formats of the 3D video signal may include a side-by-side format (FIG. 5(*a*)) in which the left-eye image L and the right-eye image R are arranged in a horizontal direction, a top/down format (FIG. 5(*b*)) in which the left-eye image and the right-eye image are arranged in a vertical direction, a frame sequential format (FIG. 5(c)) in which the left-eye image and the right-eye image are time-divisionally arranged, an interlaced format (FIG. 5(d)) in which the left-eye image and the right-eye image are mixed in line units, and a checker box format (FIG. 5(e)) in which the left-eye image and the right-eye image are mixed in box units.

The OSD generator 440 generates an OSD signal autonomously or according to user input. For example, the OSD generator 440 may generate signals by which a variety of information is displayed as graphics or text on the display 180, according to user input signals. The OSD signal may include various data such as a User Interface (UI), a variety of menus, widgets, icons, etc. Also, the OSD signal may include a 2D object and/or a 3D object.

The mixer 445 may mix the decoded video signal processed by the video processor 420 with the OSD signal generated by the OSD generator 440. The OSD signal and the decoded video signal each may include at least one of a 2D signal or a 3D signal. The mixed video signal is provided to the FRC 450.

The FRC 450 may change the frame rate of the received video signal. The FRC 350 may output an input frame rate without frame rate conversion.

The formatter 460 receives the signal mixed by the mixer 445, that is, the OSD signal and the decoded video signal, changes the format of the signal to suit the display 180, and outputs the signal with the changed format. For example, the formatter 460 may output RGB data signal. The RGB data signal may be output as a low voltage differential signaling (LVDS) or mini-LVDS.

The formatter 460 may separate a 2D video signal and a 3D video signal, in order to display a 3D image. The formatter 460 may change the format of the 3D video signal or convert a 2D video signal into a 3D video signal.

The formatter 460 may change the format of the 3D video signal, for example, to one of the various formats illustrated in FIG. 5. As shown in FIG. 6, an operation of a 3D viewing device may be performed according to the format.

FIG. 6(a) illustrates an exemplary operation of the 3D viewing device 195 and, more particularly, the shutter glasses 195 in the case where the formatter 460 outputs the frame sequential format illustrated in FIG. 5.

When the left-eye image L is displayed on the display 180, the left lens of the shutter glasses 195 is opened and the right lens is closed. When the right-eye image R is displayed on the display 180, the left lens of the shutter glasses 195 is closed and the right lens is opened.

FIG. 6(b) illustrates an exemplary operation of the 3D viewing device 195 and, more particularly, the polarized glasses 195 in the case where the formatter 460 outputs the side-by-side format illustrated in FIG. 5. The polarized glasses 195 are of passive type and maintains both the left-eye lens and the right-eye lens in an open state.

Meanwhile, the formatter 460 may convert a 2D video signal into a 3D video signal. For example, the formatter 460 may detect edges or a selectable object from the 2D video signal and generate a 3D video signal with an object based on the detected edges or the selectable object. As described before, the 3D video signal may be separated into left-eye and right-eye image signals L and R.

The audio processor (not shown) of the controller 170 may process the demultiplexed audio signal. For audio processing, the audio processor (not shown) may include various decoders.

The audio processor (not shown) of the controller 170 may control bass, treble, and volume of the audio signal.

The data processor (not shown) of the controller 170 may process the demultiplexed data signal. For example, if the demultiplexed data signal was encoded, the data processor may decode the data signal. The encoded data signal may be Electronic Program Guide (EPG) information including broadcasting information such as the starts, ends, etc. of broadcast programs of each channel.

Although the signals from the OSD generator 440 and the video processor 420 are mixed by the mixer 445 and then are subjected to 3D processing by the formatter 460 in FIG. 4, the present invention is not limited thereto and the mixer may be located at the next stage of the formatter. That is, the formatter 460 may perform 3D processing with respect to the output of the video processor 420, the OSD generator 440 may perform OSD generation and 3D processing, and then the mixer 445 may mix the processed 3D signals.

The block diagram of the controller 170 shown in FIG. 4 is exemplary. The components of the block diagrams may be integrated or omitted, or a new component may be added according to the specifications of the controller 170.

In particular, the FRC 450 and the formatter 460 may not be provided in the controller 170 and may be provided separately from the controller 170.

Figure 7:
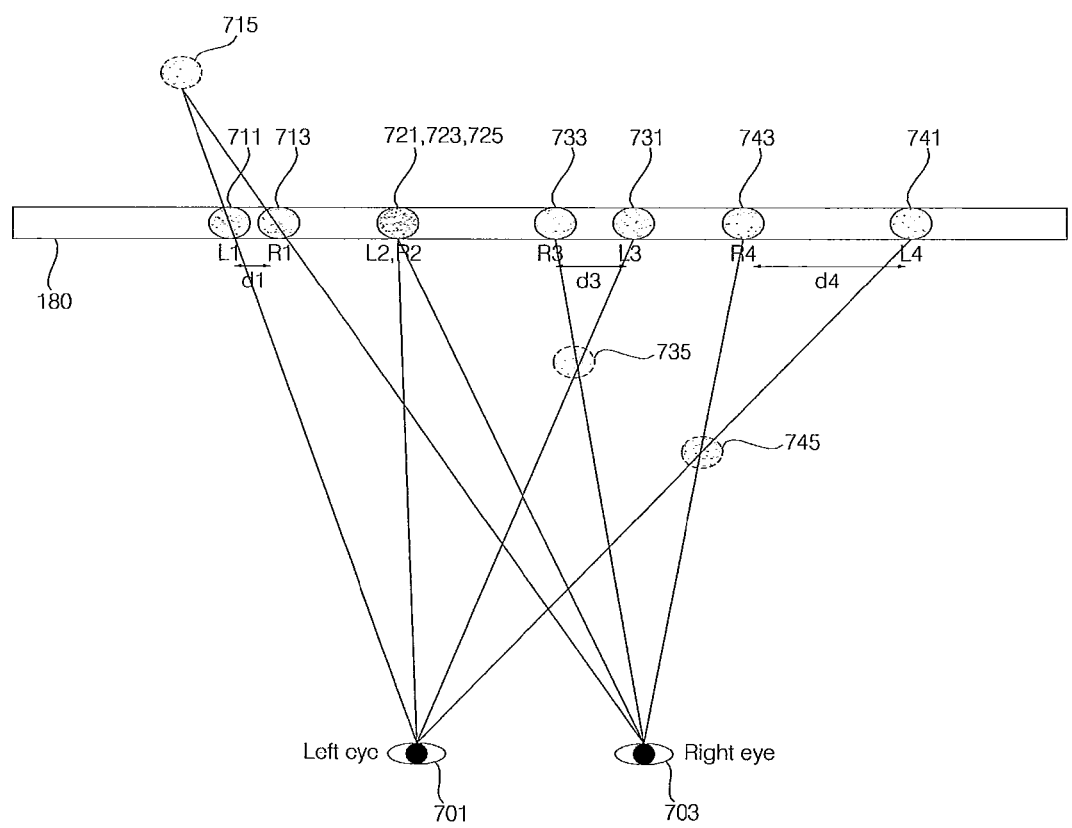
FIG. 7 is a diagram explaining an image formed by a left-eye image and a right-eye image.
Figure 8:
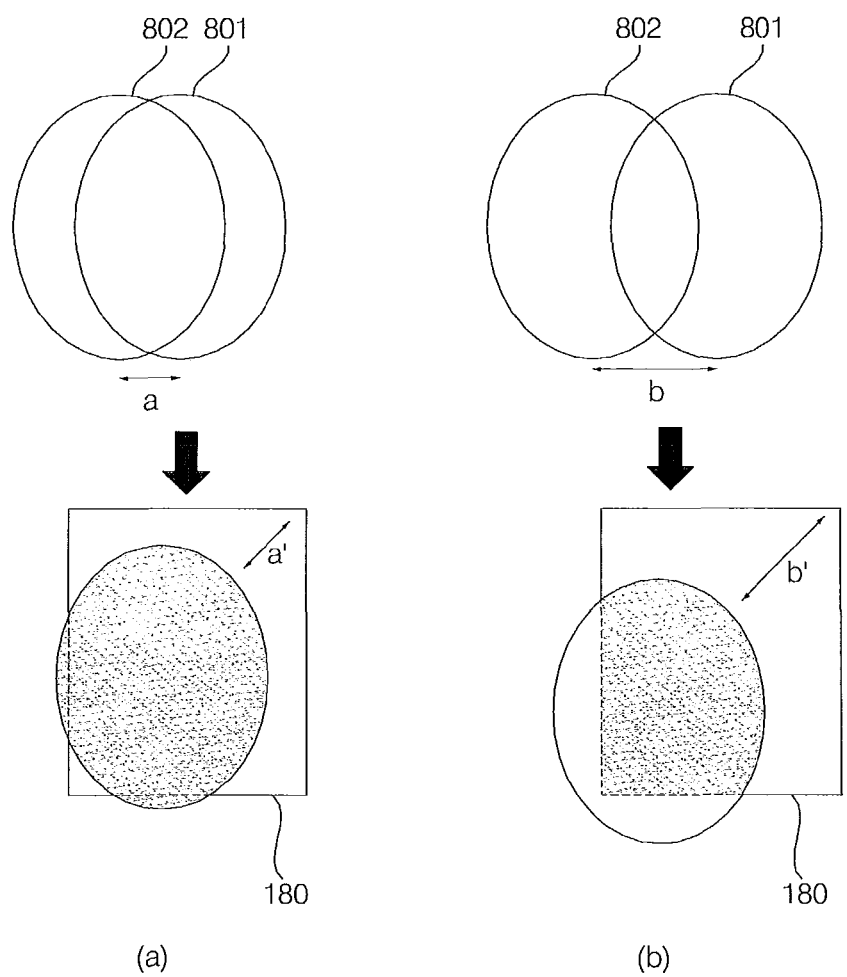
FIG. 8 is a diagram explaining the depth of a 3D image according to a disparity between a left-eye image and a right-eye image.

FIG. 7 is a diagram explaining an image formed by a left-eye image and a right-eye image, and FIG. 8 is a diagram explaining the depth of a 3D image according to a disparity between a left-eye image and a right-eye image.

First, referring to FIG. 7, a plurality of images or a plurality of objects 715, 725, 735 and 745 is shown.

A first object 715 includes a first left-eye image 711 (L) based on a first left-eye image signal and a first right-eye image 713 (R) based on a first right-eye image signal, and a disparity between the first left-eye image 711 (L) and the first right-eye image 713 (R) is d1 on the display 180. The user sees an image as formed at the intersection between a line connecting a left eye 701 to the first left-eye image 711 and a line connecting a right eye 703 to the first right-eye image 713. Therefore, the user perceives the first object 715 as being located behind the display 180.

Since a second object 725 includes a second left-eye image 721 (L) and a second right-eye image 723 (R), which are displayed on the display 180 to overlap, a disparity between the second left-eye image 721 and the second right-eye image 723 is 0. Thus, the user perceives the second object 725 as being on the display 180.

A third object 735 includes a third left-eye image 731 (L) and a third right-eye image 733 (R) and a fourth object 745 includes a fourth left-eye image 741 (L) with a fourth right-eye image 743 (R). A disparity between the third left-eye image 731 and the third right-eye images 733 is d3 and a disparity between the fourth left-eye image 741 and the fourth right-eye image 743 is d4.

The user perceives the third and fourth objects 735 and 745 at image-formed positions, that is, as being positioned before the display 180.

Because the disparity d4 between the fourth left-eye image 741 and the fourth right-eye image 743 is greater than the disparity d3 between the third left-eye image 731 and the third right-eye image 733, the fourth object 745 appears to be positioned closer to the viewer than the third object 735.

In embodiments of the present invention, the distances between the display 180 and the objects 715, 725, 735 and 745 are represented as depths. When an object is perceived as being positioned behind the display 180, the depth of the object is negative-signed. On the other hand, when an object is perceived as being positioned before the display 180, the depth of the object is positive-signed. Therefore, as an object appears closer to the user, the depth of the object is larger.

Referring to FIG. 8, if the disparity a between a left-eye image 801 and a right-eye image 802 in FIG. 8(a) is smaller than the disparity b between the left-eye image 801 and the right-eye image 802 in FIG. 8(b), the depth a' of a 3D object created in FIG. 8(a) is smaller than the depth b' of a 3D object created in FIG. 8(b).

In the case where a left-eye image and a right-eye image are combined into a 3D image, the positions of the images perceived by the user may changed by the disparity between the left-eye image and the right-eye image. This means that the depth of a 3D image or 3D object formed with a left-eye image and a right-eye image in combination may be controlled by adjusting the disparity between the left-eye and right-eye images.

Figure 9:
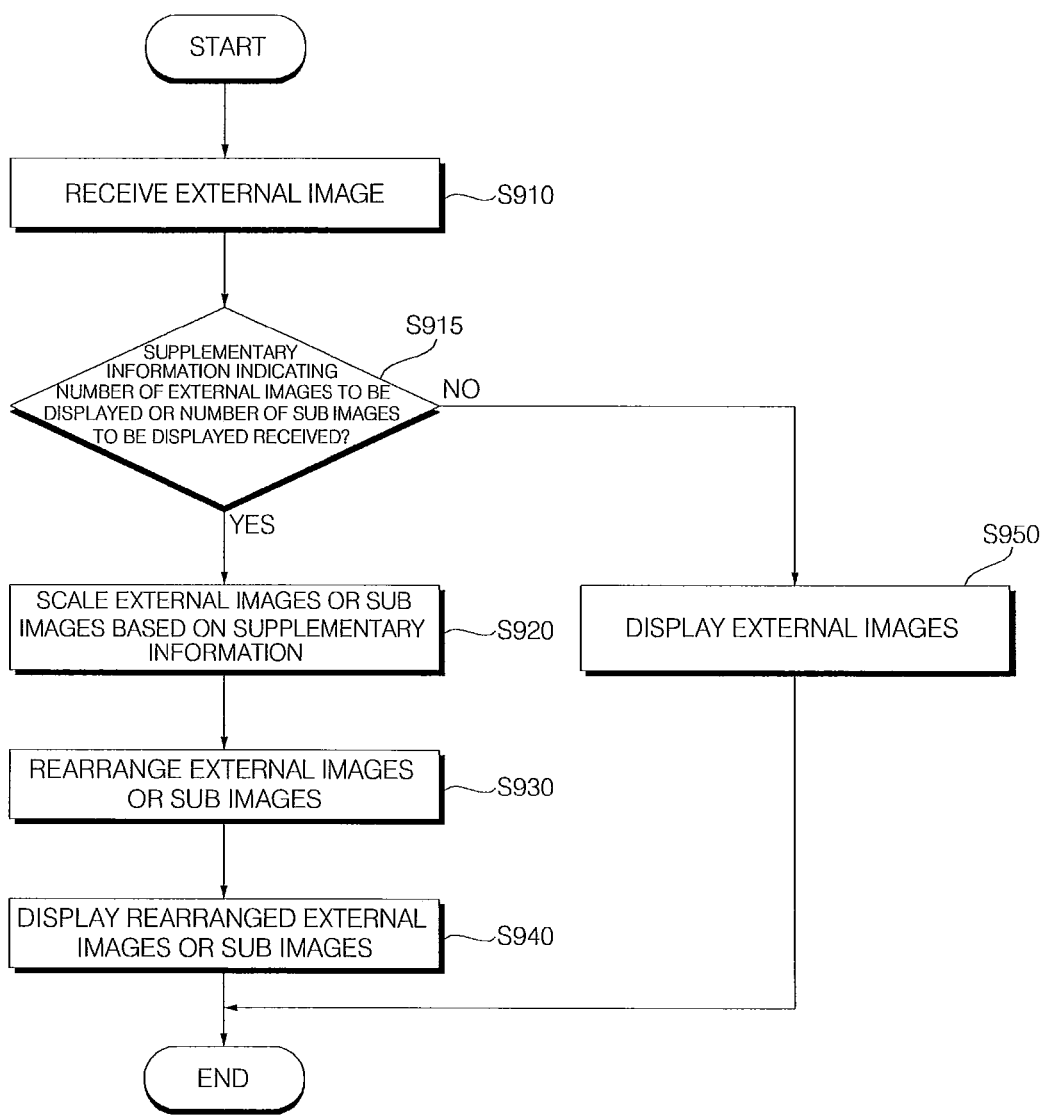
FIG. 9 is a flowchart illustrating a method for operating an image display apparatus according to an embodiment of the present invention.

FIG. 9 is a flowchart illustrating a method for operating an image display apparatus according to an embodiment of the present invention, and FIGS. 10 to 22 are views referred to for describing various examples of the method for operating the image display apparatus illustrated in FIG. 9.

First, an external image is received (S910). The image display apparatus 100 may receive an external image from a broadcast station, a network server or an external apparatus.

The external image is received from one source and may be, for example, a broadcast signal image of a specific channel, a specific content image provided by a content provider or a game image received from an external apparatus such as a game console.

Since the game console 300 is connected to the image display apparatus 100 in FIG. 1, hereinafter, it is assumed that an image is received from the game console 300.

Figure 16:
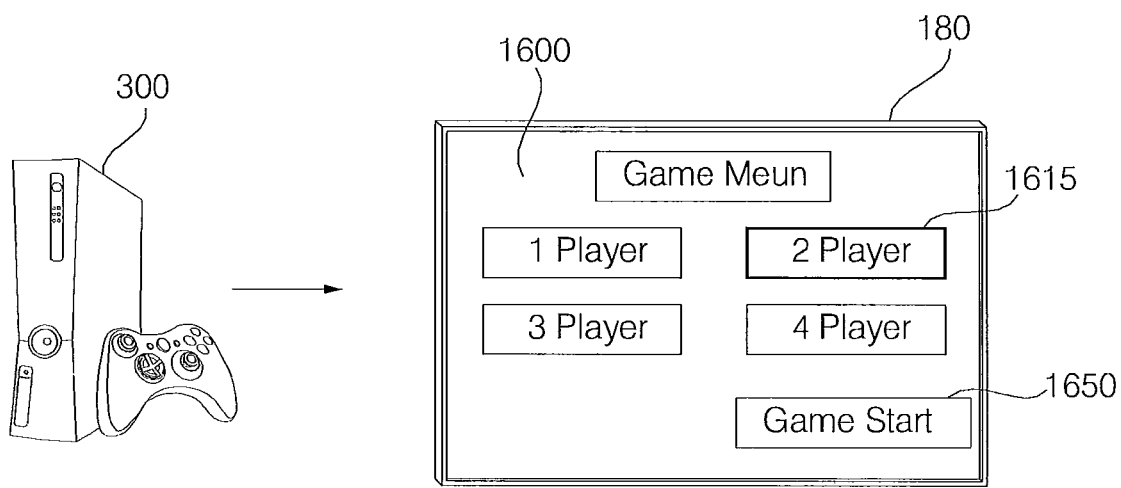
Figure 17:
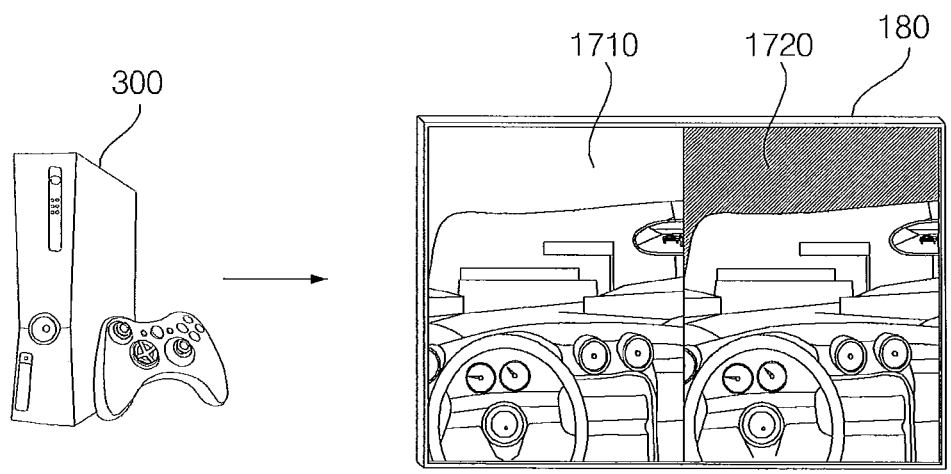
Figure 18:
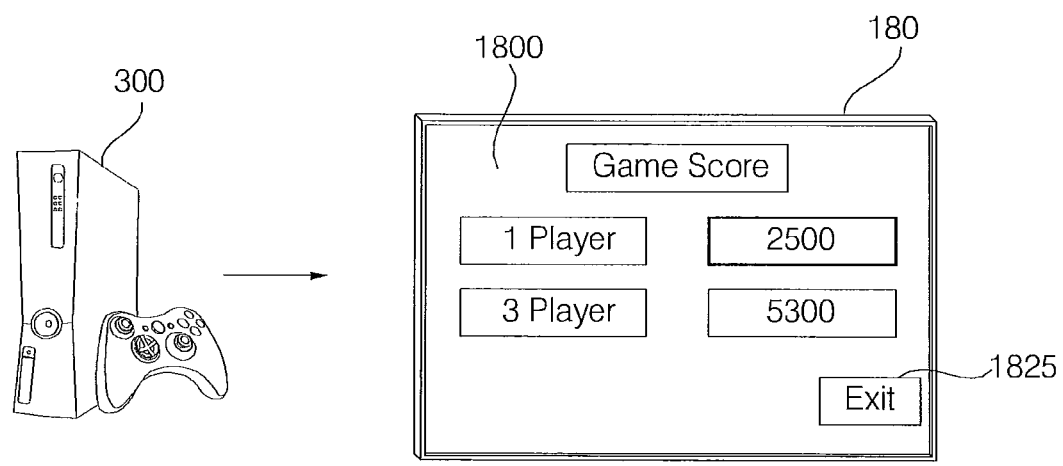

The game console 300 may provide various images such as a menu screen 1600 before starting a game shown in FIG. 16, a game screen shown in FIG. 17 and a game end screen 1800 shown in FIG. 18 to the image display apparatus 100.

The game console 300 may provide a game screen for a plurality of users, instead to a game screen for one user. For example, if only one user plays a game, the image display apparatus 100 displays a game screen for one user, which is output from the game console 300. As another example, if two users play a game, the image display apparatus 100 displays a game screen for two users, which is output from the game console 300.

If a plurality of users plays a duel mode game, the game console 300 provides a game screen including a plurality of sub image screens corresponding to the respective users. Such a game screen is divided into a plurality of screen parts within a single frame and the divided screen parts are provided.

For example, if a 2-player object 1615 is selected from the menu screen 1600 and a game start object 1650 is selected as shown in FIG. 16, a first sub image 1710 and a second sub image 1720 are displayed on one display 180 as shown in FIG. 17. After the game is finished, as shown in FIG. 18, the game end screen 1800 including an exit item 1825 may be displayed.

Referring to FIGS. 16 to 18, a 2-player duel mode game is displayed on the actual game screen shown in FIG. 17.

In the embodiment of the present invention, various methods of detecting the number of external images or sub images to be displayed will be described. The external images or sub images are scaled and rearranged according to the detected number of external images or sub images, thereby improving visibility.

Figure 10:
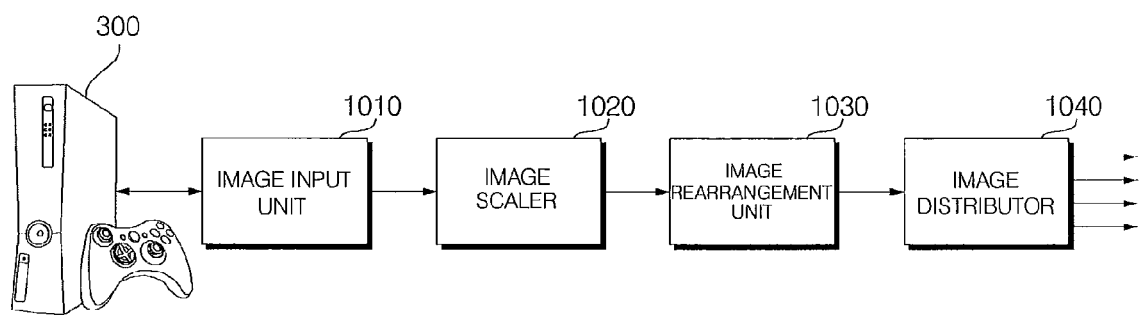

The reception of the external image of step S910 may be performed by an image input unit 1010 of FIG. 10. That is, the image input unit 1010 may receive an image including a plurality of sub images from the game console 300. The image input unit 1010 of FIG. 10 may correspond to the external device interface 300 of FIG. 3.

Next, it is determined whether supplementary information indicating the number of external images to be displayed or the number of sub images to be displayed is received (S950). If the supplementary information is received, step S920 is performed and, if the supplementary information is not received, step S950 is performed.

The image input unit 1010 may receive supplementary information associated with the external image in addition to the external image. The supplementary information may be metadata or a flag.

For example, if data transmission between the game console 300 and the image display apparatus 100 is performed based on the HDMI standard, supplementary information indicating the number of external images to be displayed or the number of sub images may be transmitted using reserved bits.

The HDMI standard will now be described with reference to FIGS. 11 to 14. Hereinafter, the HDMI 1.4 standard will be focused upon.

FIG. 11 shows a table 8-10 of the HDMI 1.4 standard and shows an HDMI Vendor Specific Infoframe Packet Header, that is, a VSI header.

FIG. 12 shows a table 8-11 of the HDMI 1.4 standard and shows HDMI Vendor Specific Infoframe Packet Contents. "HDMI_Video_Format" has three bits and defines the structure of an extended video format.

FIG. 13 shows a table 8-12 of the HDMI 1.4 standard and describes HDMI_Video_Format of Table 8-11. If "HDMI_Video_Format" has bits of "010", 4-bit "3D_Structure" shown in FIG. 12 is included.

FIG. 14 shows Table H-1 of the HDMI 1.4 standard and shows HDMI Vendor Specific Infoframe Packet Contents. In the embodiment of the present invention, some reserved bits are separately defined in the table of FIG. 14 so as to represent supplementary information indicating the number of external images to be displayed or the number of sub images as described above.

More specifically, an N_View_present flag and N_View_NumOfView information are used. In the embodiment of the present invention, reserved bits are used.

That is, if the N_View_present flag is set to "1", the N_View_NumOfView value is referred to. The N_View_NumOfView value has 4 bits and indicates the number of external images to be displayed or the number of sub images in the external image to be displayed. The N_View_NumOfView value may be set to a maximum of 16.

As described above, the image input unit 1010 of FIG. 10 determines whether the N_View_present flag indicating presence of the number of images to be displayed is present in packets (more specifically, metadata) received from the game console 300 as shown in FIG. 14 and decodes the N_View_NumOfView information indicating the number of external images to be displayed or the number of sub images to be displayed so as to detect the number of images if the N_View_present flag is present. Accordingly, the image display apparatus 100 can conveniently detect the number of external images to be displayed.

The image display apparatus 100 may display M views with respect to the input external image and then display N views after receiving the supplementary information.

For example, if the menu screen 1600 having one view is input as the external image as shown in FIG. 16 and the duel mode image including the sub images 1710 and 1720 having two views is then input as shown in FIG. 17, the N_View_present flag (=1) and the N_View_NumOfView information (=2) may be received when the image is changed. Then, the image display apparatus 100 may display one (M=1) image 600 without a sub image and then display an image having two (N=2) sub images 1710 and 1720.

As another example, if the duel mode image including the sub images 1710 and 1720 having two views is input as an external image as shown in FIG. 17 and the game end screen 1800 having one view is then input as shown in FIG. 18, the N_View_present flag (=1) and the N_View_NumOfView information (=1) may be received when the image is changed. Then, the image display apparatus 100 may display the image having 2 (N=2) sub images 1710 and 1720 and then display one (M=1) image 1600 without a sub image.

Using "3D_Structure" information indicating a 3D structure and "3D-Meta_present" information indicating presence/absence of 3D metadata of FIG. 14, a 3D format and a 3D frame may be detected. More specifically, it is possible to simply detect when a 2D image is changed to a 3D image as an external image. Alternatively, it is possible to simply detect when a 3D image is changed to a 2D image.

Figure 15:
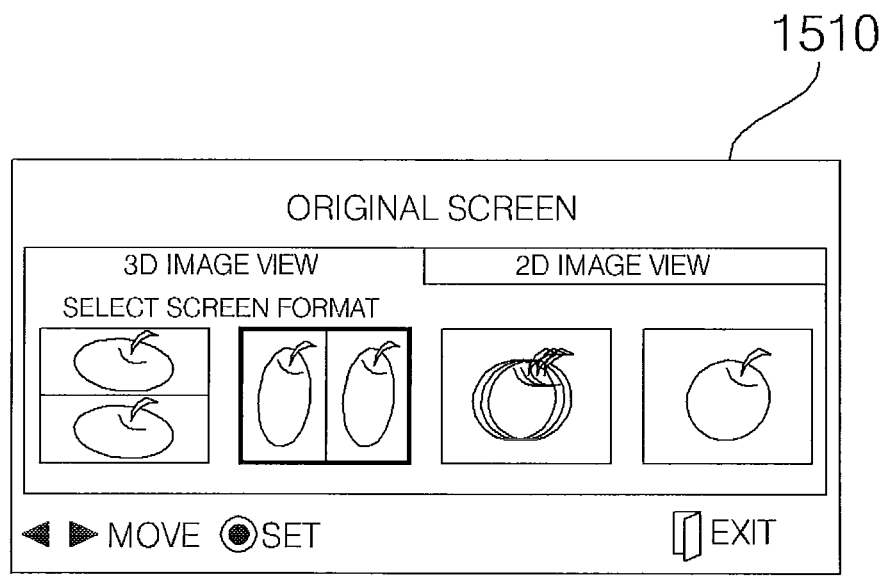

FIG. 15 shows a separate menu 1510 necessary for switching between a 2D image and a 3D image.

For example, in case of an analog broadcast signal or a digital broadcast signal, since information indicating switching between a 2D image and a 3D image is not included in the broadcast signal, the separate menu 1510 shown in FIG. 15 is necessary.

FIG. 15 shows a menu for selecting a format when a 3D image is selected, in addition to a menu for selecting 2D image display and 3D image display.

If the standard shown in FIGS. 11 to 14 is not present, if information indicating the number of external images to be displayed is not received, or if the number of images or sub images to be displayed is changed, the separate menu (not shown) for selecting the number of images to be displayed like the separate menu 1510 of FIG. 15 is necessary.

However, as described with reference to FIGS. 11 to 14, if supplementary information indicating the number of external images to be displayed is received as in the set standard, it is possible to easily detect the number of external images to be displayed or the number of sub images in an external image to be displayed. In particular, it is possible to easily detect change in the number of external images to be displayed or change in the number of sub images to be displayed. Thus, the separate menu (not shown) for selecting the number of images to be displayed is not necessary. However, the separate menu 1510 for selecting a format of a 3D image, or for selecting 2D image display and 3D image display shown in FIG. 15 may be necessary.

The image input unit 1010 may receive an analog signal from the game console 300 and convert the analog signal into a digital signal.

The image input unit 1010 may store Extended Display Identification Data (EDID). The EDID information may be attribute information of the image display apparatus, such as resolution supported by the image display apparatus 100, 3D function support or HDMI function support. The image input unit 1010 may store the HDMI standard.

If the image input unit 1010 provides the EDID information to the game console 300, the game console 300 determines whether M views may be displayed, whether 3D image display is supported or display resolution and provides data, supplementary information or M images. The image input unit 1010 receives data, supplementary information or M images from the game console 300.

Next, the input sub images are scaled based on the supplementary information (S920). If the remaining region excluding the sub images is present in the input external image, scaling is necessary. In addition, if a plurality of input sub images is displayed on a plurality of displays as shown in FIG. 2, scaling is necessary. If a plurality of input sub images is converted into a frame sequential format, scaling is necessary.

An image scaler 1020 of FIG. 10 scales the sub images. The image scaler 1020 of FIG. 10 may correspond to the scaler 435 of the video processor 420 of FIG. 4.

Figure 21:
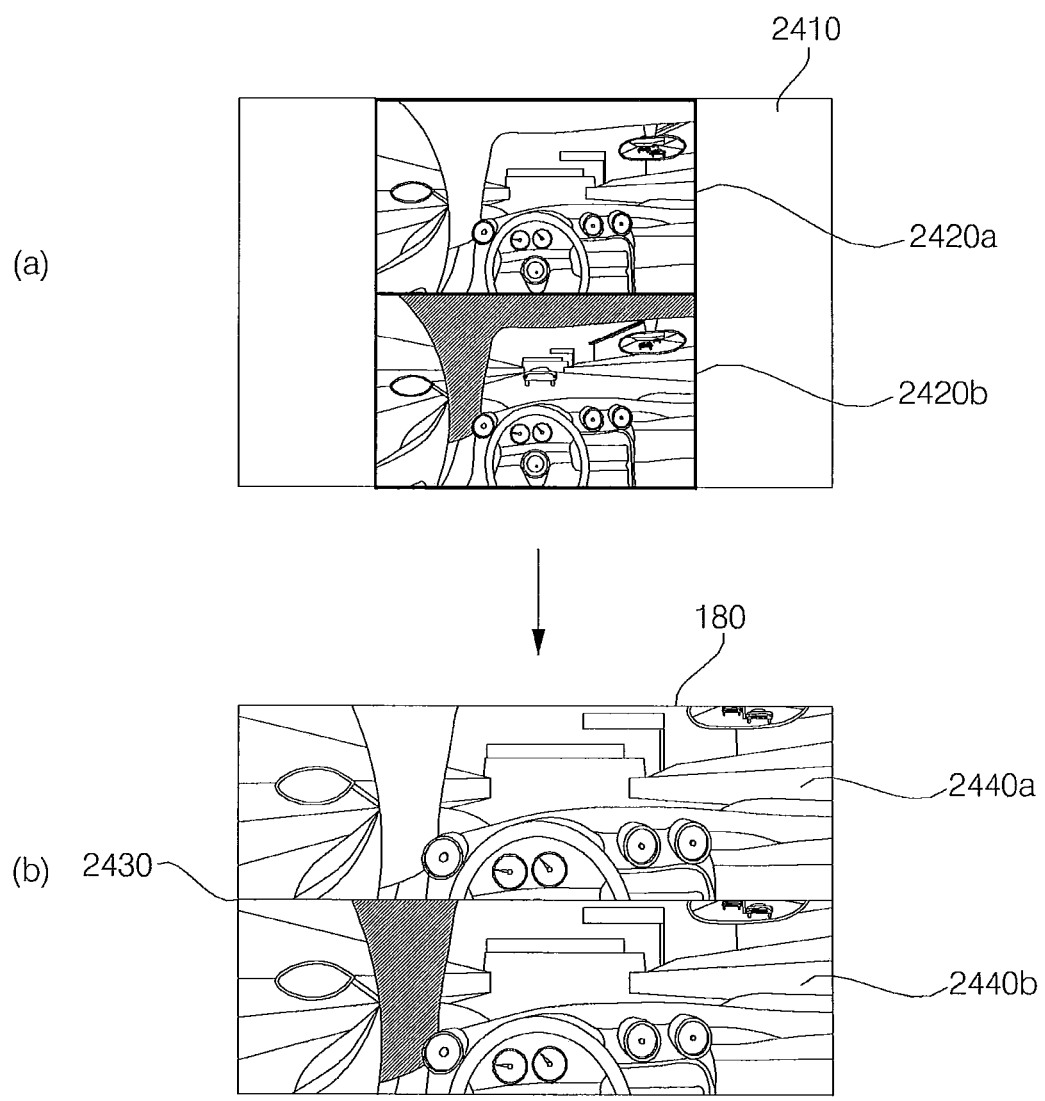

For example, as shown in FIG. 21, if the number of sub images 2420a and 2420b to be displayed in an input external image 2410 is 2 and the remaining region excluding the sub images is present, the sub images 2420a and 2420b are scaled up so as to be displayed in the full region of the display 180. In FIG. 21, the horizontal parts of the sub images 2420a and 2420b are scaled up using a horizontal zoom function. As the remaining region is increased, a scale factor may be increased.

Figure 22:
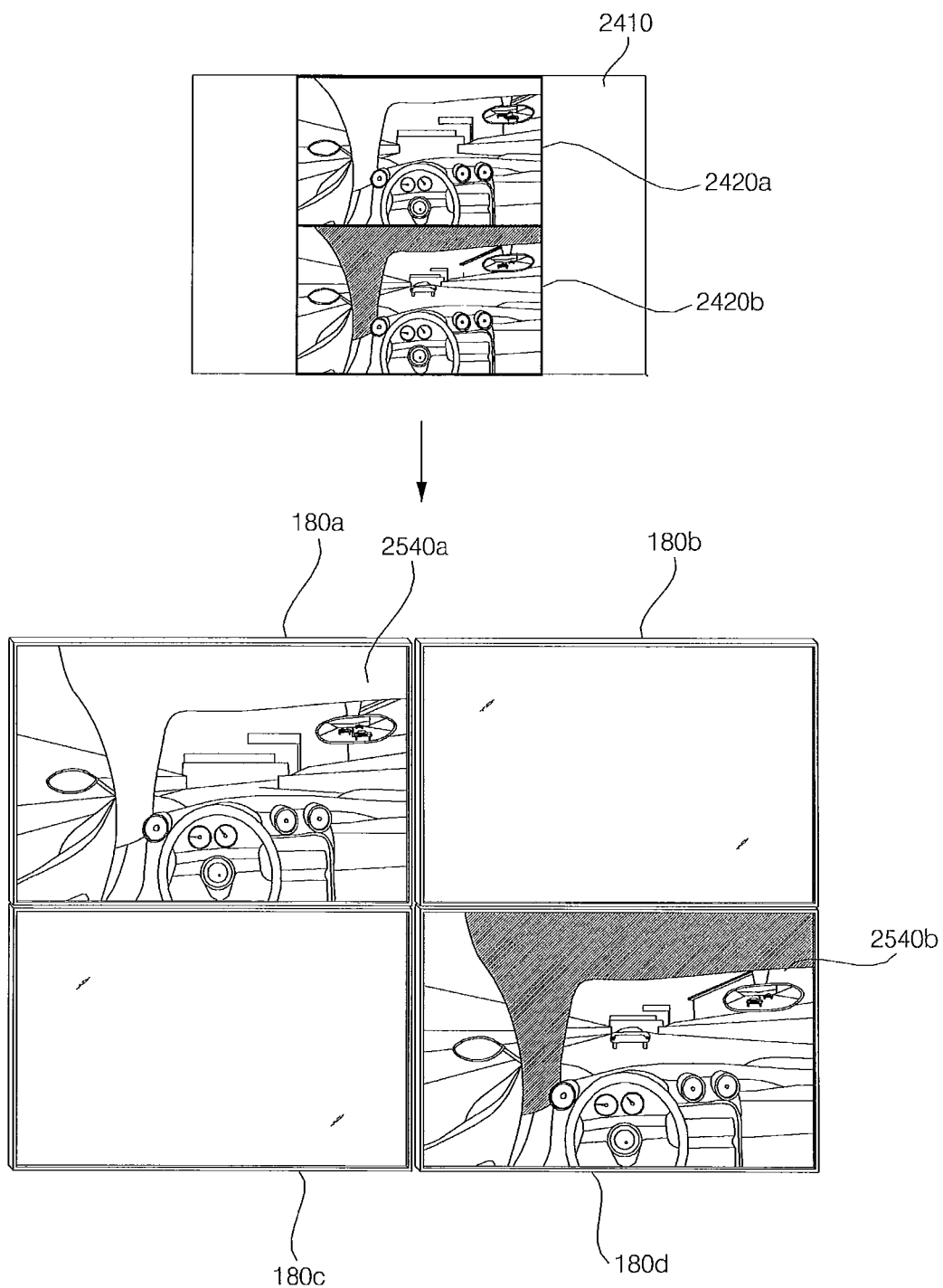

As another example, as shown in FIG. 22, if the number of sub images 2420a and 2420b to be displayed in an input external image 2410 is 2 and the number of display panels 180a, 180b, 180c and 180d is 4 as shown in FIG. 2, the sizes of the sub images 2420a and 2420b substantially double so as to be displayed on two displays.

The scale factor may be changed according to the number of displays. For example, as the number of displays is increased, the scale factor may be increased.

The scale factor may be changed according to the number of sub images to be displayed. For example, as the number of sub images is increased, the scale factor may be decreased.

Scaling may be performed in consideration of the remaining region excluding the sub images of the input game screen.

Step S920 may be selectively performed. For example, if the number of displays is one and an image non-display region is not present, a next step, that is, a sub image rearrangement step, may be performed without scaling.

Next, the sub images are rearranged (S930). The rearranged sub images are distributed to and displayed on the displays (S940).

An image rearrangement unit 1030 of FIG. 10 rearranges the sub images scaled by the image scaler 1020. The image distributor 1040 distributes the rearranged sub images to the displays. The image rearrangement unit 1030 may correspond to the video processor 420, the FRC 450 or the formatter 460 of FIG. 4. The image distributor 1040 may correspond to the formatter 460 of FIG. 4.

If the display includes the four displays 180a, 180b, 180c and 180d as shown in FIG. 2, the image rearrangement unit 1030 rearranges the sub images and the image distributor 1040 distributes and displays the sub images to and on the four displays.

Preferably, the sub images are arranged to be maximally spaced apart from each other, thereby preventing a plurality of users from confusing the sub images.

For example, preferably, the image rearrangement unit 1030 respectively arranges a first sub image and a second sub image on a first display and a second display maximally spaced apart from each other among the plurality of displays.

The image rearrangement unit 1030 preferably arranges one sub image on any one of the plurality of displays.

As shown in FIG. 22(b), the sub images 2420a and 2420b for two players may be scaled and the scaled first sub image 2540a and second sub image 2540b may be respectively displayed on the first display panel 180a and the second display panel 180d maximally spaced apart from each other among the four display panels. The sub images may be respectively displayed on the second display panel 180*b* and the third display panel 180*c*. In this manner, visibility of the sub images of the users is improved when a duel mode game screen is viewed.

The image rearrangement unit 1030 and the image distributor 1040 may perform signal processing such that the scaled-up sub images 2440*a* and 2440*b* are displayed on one display 180 as shown in FIG. 21.

For example, the scaled-up sub images 2440*a* and 2440*b* may be displayed as 3D images. That is, the first sub image 2440*a* may be displayed as a left-eye image and the second sub image 2440*b* may be displayed as a right-eye image. Then, a first user who wears first polarized glasses with a polarized left lens may view only the first sub image 2440*a* and a second user who wears second polarized glasses with a polarized right lens may view only the second sub image 2440*b*.

If the supplementary information is not received in step S915, the input external image is displayed without conversion (S950).

According to the embodiment of the present invention, by receiving the supplementary information indicating the number of images to be displayed or the number of sub images to be displayed and analyzing the supplementary information, it is possible to detect the number of images to be displayed in real time.

Thus, the image display apparatus 100 may display an object indicating the number of images to be displayed when the number of images to be displayed is changed during external image display.

Figure 19:
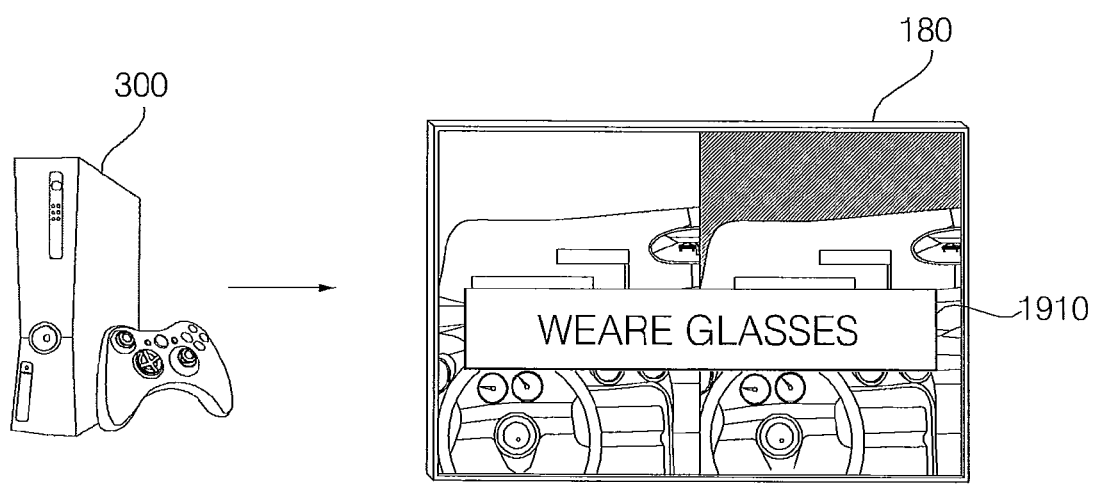

For example, if the game menu screen is changed to the duel mode screen shown in FIG. 21 and the sub images 2440*a* and 2440*b* are displayed on one display 180 using a 3D method, an object 1910 indicating a glasses wear message may be displayed as shown in FIG. 19. In particular, if a 3D image with the first sub image 2440*a* as the left-eye image and the second sub image 2440*b* as the right-eye image is displayed, the first user wears the first polarized glasses with the polarized left lens and the second user wares the second polarized glasses with the polarized right lens.

If the number of external images to be displayed or the number of sub images to be displayed is increased, it is possible to increase user convenience by displaying the object indicating the glasses wear message.

Figure 20:
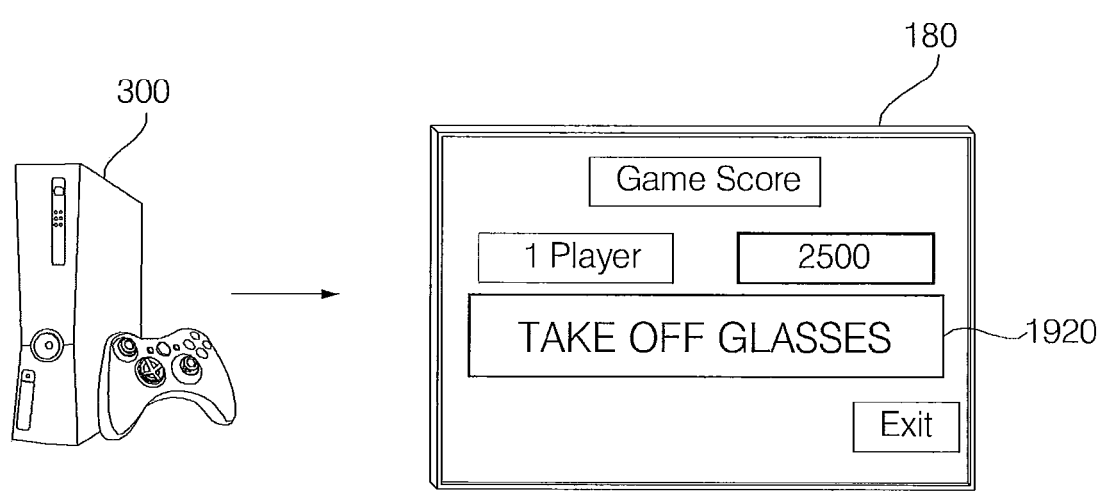

As another example, if the input external image is changed from the duel mode screen shown in FIG. 21 to the game end screen shown in FIG. 22, an object 1920 indicating a glasses removal message may be displayed as shown in FIG. 20. The first user and the second user may immediately take off the first polarized glasses with the polarized left lens and the second polarized glasses with the polarized right lens, respectively.

If the number of external images to be displayed or the number of sub images to be displayed is decreased, it is possible to increase user convenience by displaying an object indicating a glasses removal message.

Figure 23:
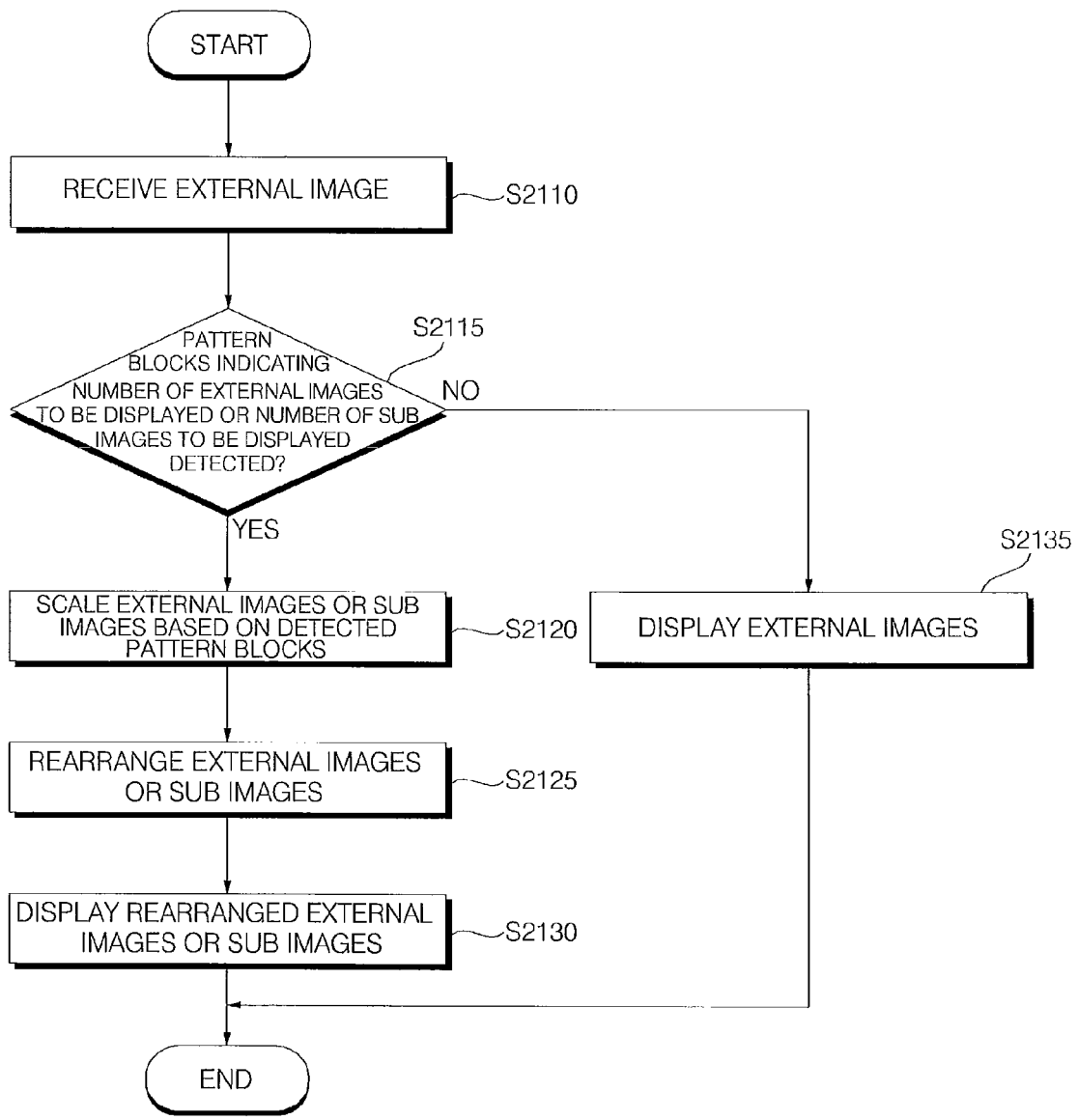
FIG. 23 is a flowchart illustrating a method for operating an image display apparatus according to an embodiment of the present invention.
Figure 24:
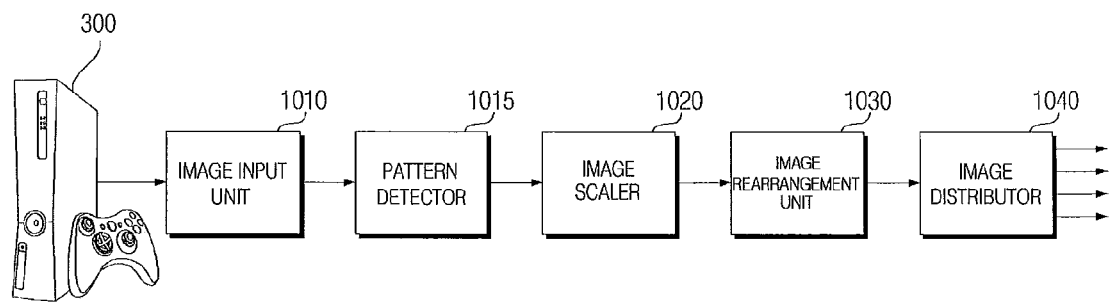
FIGS. 24 to 25 are views referred to for describing various examples of the method for operating the image display apparatus, illustrated in FIG. 23.
Figure 25:
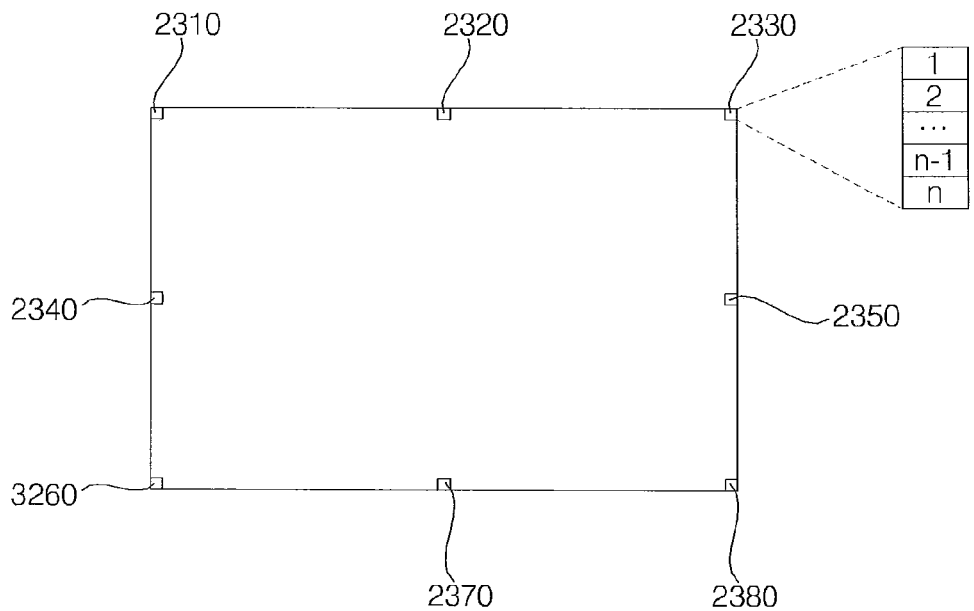

FIG. 23 is a flowchart illustrating a method for operating an image display apparatus according to an embodiment of the present invention, and FIGS. 24 to 25 are views referred to for describing various examples of the method for operating the image display apparatus, illustrated in FIG. 23.

The method for operating the image display apparatus of FIG. 23 corresponds to the method for operating the image display apparatus of FIG. 9 and the image display apparatus of FIG. 24 corresponds to the image display apparatus of FIG. 10. Hereinafter, a difference therebetween will be focused upon.

In order to detect the number of external images to be displayed or the number of sub images in the external images to be displayed from the external apparatus and, more particularly, the game console 300, the image display apparatus and the method for operating the same shown in FIGS. 23 to 25 use an image pattern block detection method instead of the above-described supplementary information.

In step S2115, it is determined whether a pattern block indicating the number of external images to be displayed or the number of sub images in the external image to be displayed is detected from the external image received in step S2110. The pattern block is detected by a pattern detector 1015.

FIG. 25 shows an example of the pattern block of the input external image. Eight pattern blocks 2310 to 2380 may be arranged in a single image frame. Various types of pattern blocks may be used.

The pattern block may be a replacement for original external input image data and may be inserted in order to represent the number of external images to be displayed. The pattern block may be inserted according to user settings or a predetermined rule. The pattern block may include one or more pixels.

If the number of pattern blocks inserted into the input external image is i and the number of levels of the pattern blocks is set to n, $n^i$ data may be obtained.

For example, in case of 8-bit data of 0 to 255, 0 to 31 may be set to a level 1, 32 to 63 may be set to a level 2, . . . , that is, eight levels may be set. In FIG. 25, the number of cases is about 16 million.

Using such pattern blocks, a predetermined rule is made between the external apparatus and the image display apparatus.

For example, if the number NumOfNView of sub images to be displayed is 2, "12345678" may be allocated to the pattern blocks. That is, "1" may be allocated to a first pattern block 2310, may be allocated to a second pattern block 2320, . . . , and "8" may be allocated to an eighth pattern block 2380.

As another example, if the number NumOfNView of sub images to be displayed is 1, "01243523" may be allocated to the pattern blocks. That is, "0" may be allocated to a first pattern block 2310, "1" may be allocated to a second pattern block 2320, . . . , and "3" may be allocated to an eighth pattern block 2380.

The pattern detector 1015 may detect pixel data of predetermined blocks (eight blocks of FIG. 23) in the input external image and check the level thereof. The level of the pixel data may be the level of the luminance data between chrominance data and luminance data.

The pattern detector 1015 may use various methods in order to rapidly detect the patterns. For example, the pattern detector 1015 may detect the levels of the first to third pattern blocks 2310, 2320 and 2330 of FIG. 25, detect the levels of the fourth and fifth pattern blocks 2340 and 2350 if the detected levels match previously stored data, and detect the sixth to eighth pattern blocks 2360, 2370 and 2380 if the detected levels match the previously stored data. If all the detected levels match the previously stored data, the number of images to be displayed is detected.

For example, if the number n of images to be displayed is 2, "12345678" may be allocated to the pattern blocks. Thus, the pattern detector 1015 detects whether the levels of the first to third pattern blocks 2310, 2310 and 2330 are respectively 1, 2 and 3 and finishes pattern block detection if the levels of the first to third pattern blocks 2310, 2310 and 2330 are not respectively 1, 2 and 3, detects whether the levels of the fourth and fifth pattern blocks 2340 and 2350 are respectively 4 and 5 if the levels of the first to third pattern blocks 2310, 2310 and 2330 are respectively 1, 2 and 3, and detects whether the levels of the sixth to eighth pattern blocks 2360, 2370 and 2380 are respectively 6, 7 and 8 if the levels of the fourth and fifth pattern blocks 2340 and 2350 are respectively 4 and 5.

Alternatively, the positions of the pattern blocks may be changed according to resolution of an input external image. For example, as resolution of an external image is increased, a pattern block is preferably positioned at an upper end in an image frame. Accordingly, it is possible to rapidly detect the pattern blocks.

After detecting the pattern blocks, the image rearrangement unit 1030 restores the pattern data of the pattern blocks to original image data. For restoration, various methods such as a deblocking filtering method may be used. Thereafter, the pattern blocks are not displayed and the original image data is displayed in a desired region.

Since the pattern blocks are temporarily used to indicate the number of images to be displayed, pattern block detection is preferably performed before the images are rearranged by the image rearrangement unit 1030.

Since various image quality algorithms of image sharpness, noise reduction, dynamic contract may be applied to the image rearrangement unit 1030, the pattern detector 1015 is preferably located at the previous state of the image rearrangement unit 1030, in order to prevent pattern block data from being changed by the image quality algorithms.

If the number of images to be displayed or the number of external images to be displayed is detected using the pattern blocks, the image display apparatus 100 scales the image up so as to display a plurality of sub images on one display as shown in FIG. 21 or so as to respectively display a plurality of sub images on four displays as shown in FIG. 22.

An object indicating when the number of images to be displayed may be displayed when an external image is displayed.

For example, if the game menu screen is changed to the duel mode screen shown in FIG. 21 and the sub images 2440a and 2440b are displayed on one display 180 using a 3D method, the object 1910 indicating the glasses wear message may be displayed as shown in FIG. 19. Accordingly, it is possible to increase user convenience.

As another example, if the input external image is changed from the duel mode screen of FIG. 21 to the game end screen shown in FIG. 22, the object 1920 indicating the glasses removal message may be displayed as shown in FIG. 20. Accordingly, it is possible to increase user convenience.

Using the pattern blocks shown in FIG. 25, a variety of information may be included in addition to the number of images to be displayed or the number of sub images to be displayed.

For example, the number of external images or the number of sub images may be detected using the pattern block. More specifically, the first to fourth pattern blocks of FIG. 25 may indicate the number n of images to be displayed and the fifth to eighth pattern blocks may indicate the number m of input images.

Using the pattern blocks, similarly to the description of FIGS. 11 to 14, information indicating whether the input external image is a 3D image (3D structure), a 3D format type, etc. may be included. Accordingly, it is possible to determine whether the input external image is a 3D image, a 3D format, etc.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of operating an image display apparatus including an image input unit, an image rearrangement unit, and four display panels arranged in a 2×2 matrix, the method comprising:
   providing attribute information of the image display apparatus to an external device, the attribute information including information regarding resolution supported by the image display apparatus or information regarding 3D function support;
   receiving, by the image input unit, an input external image;
   receiving, by the image input unit, supplementary information indicating a number of external images to be displayed or a number of sub images in the external image to be displayed from the external device;
   rearranging, by the image rearrangement unit, the external images or the sub images based on the supplementary information; and
   displaying the rearranged external images or sub images on at least one of the four display panels,
   wherein the supplementary information includes a flag indicating presence of the number of images to be displayed in packets received from the external device, and information indicating the number of external images to be displayed or the number of sub images to be displayed so as to detect the number of images if the flag is present,
   wherein a scale factor for scaling the sub images based on the supplementary information is increased as a remaining region excluding the sub images of the input external image is increased, and
   wherein the sub images are respectively displayed on two display panels maximally spaced apart from each other among the four display panels if the number of sub images to be displayed is two.

2. The method according to claim 1, further comprising scaling the sub images based on the supplementary information,
   wherein the rearranging includes rearranging the scaled sub images.

3. The method according to claim 1, wherein the supplementary information further includes information indicating a 3D structure and information indicating presence or absence of 3D metadata.

4. The method according to claim 1, wherein the rearranging includes temporally or spatially dividing and rearranging the external images or sub images if a plurality of external images to be displayed or a plurality of sub images to be displayed is present.

5. The method according to claim 1, further comprising displaying an object indicating a glasses wear message if the number of external images to be displayed or the number of sub images to be displayed is increased.

6. The method according to claim 1, further comprising displaying an object indicating a glasses removal message if the number of external images to be displayed or the number of sub images to be displayed is decreased.

7. An image display apparatus comprising:
- an image input unit configured to provide attribute information of the image display apparatus to an external device, the attribute information including information regarding resolution supported by the image display apparatus or information regarding 3D function support, the image input unit further configured to receive an input external image and receive supplementary information indicating a number of external images to be displayed or a number of sub images in the external image to be displayed from the external device;
- an image rearrangement unit configured to rearrange the external images or sub images based on the supplementary information; and
- four display panels configured to display the rearranged external images or sub images and arranged in a 2×2 matrix, wherein the supplementary information includes a flag indicating presence of the number of images to be displayed in packets received from the external device, and information indicating the number of external images to be displayed or the number of sub images to be displayed so as to detect the number of images if the flag is present, wherein a scale factor for scaling the sub images based on the supplementary information is increased as a remaining region excluding the sub images of the input external image is increased, and wherein the sub images are respectively displayed on two display panels maximally spaced apart from each other among the four display panels if the number of sub images to be displayed is two.

8. The image display apparatus according to claim 7, further comprising a scaler configured to scale the sub images based on the supplementary information,
wherein the image rearrangement unit rearranges the scaled sub images.

9. The image display apparatus according to claim 7, wherein the image rearrangement unit temporally or spatially divides and rearranges the external images or sub images if a plurality of external images to be displayed or a plurality of sub images to be displayed is present.

10. The image display apparatus according to claim 7, wherein the supplementary information further includes information indicating a 3D structure and information indicating presence or absence of 3D metadata.

* * * * *